(12) United States Patent
Lin et al.

(10) Patent No.: US 7,404,137 B2
(45) Date of Patent: Jul. 22, 2008

(54) METHOD AND RELATED APPARATUS FOR PERFORMING ERROR CHECKING-CORRECTING

(75) Inventors: Jiing Lin, Taipei Hsien (TW); Iris Jiang, Taipei Hsien (TW); Jie Ding, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 513 days.

(21) Appl. No.: 10/908,555

(22) Filed: May 17, 2005

(65) Prior Publication Data

US 2006/0117239 A1 Jun. 1, 2006

(30) Foreign Application Priority Data

Nov. 16, 2004 (TW) .............................. 93135158 A

(51) Int. Cl.
*G11C 29/00* (2006.01)

(52) U.S. Cl. ...................................................... 714/768
(58) Field of Classification Search ................. 714/763, 714/746
See application file for complete search history.

(56) References Cited

U.S. PATENT DOCUMENTS

| 6,070,262 | A | * | 5/2000 | Kellogg et al. ............... 714/763 |
| 6,212,631 | B1 | * | 4/2001 | Springer et al. ................ 713/1 |
| 7,117,421 | B1 | * | 10/2006 | Danilak ....................... 714/763 |
| 2006/0123320 | A1 | * | 6/2006 | Vogt ........................... 714/762 |

* cited by examiner

*Primary Examiner*—Shelly A Chase
(74) *Attorney, Agent, or Firm*—Winston Hsu

(57) ABSTRACT

A method and related apparatus for performing error checking-correcting (ECC). The method divides a memory space provided by a memory into an ECC range and a non-ECC range. When data is read or written, the method determines the address of data is within the ECC range or the non-ECC range so as to decide whether error checking-correcting is performed on the data.

12 Claims, 4 Drawing Sheets

METHOD AND RELATED APPARATUS FOR PERFORMING ERROR CHECKING-CORRECTING

BACKGROUND OF INVENTION

1. Field of the Invention

The present invention relates to a method and related apparatus for performing error checking and correcting, and more particularly, to a method and related apparatus for determining whether an error checking-correcting function is performed on data based on an address of the data.

2. Description of the Prior Art

Computer systems are indispensable to the information society. With a computer system, it is convenient for users to calculate, access, and manage a large amount of information, data, and video at high speed. Therefore, information technology manufacturers have been devoted to improving the performance of computer systems to access data more precisely.

Generally, a computer system comprises a central processing unit (CPU) for controlling the operation of the computer system, a memory for storing data, and a control chip (such as a north bridge circuit or chipset) for managing data transmission between the CPU and the memory. Many error detection schemes have been used in computer systems to ensure that the CPU (and other circuits in the computer system) can access data from the memory precisely. Take an error checking-detecting (ECC) function for example. The ECC function can detect errors and correct errors simultaneously. A control chip can implement the ECC function.

When performing the ECC function, if a write command indicates to store data into the memory, the control chip processes data and generates a verifying ECC code accordingly. The data and the ECC code will be stored in the memory at the same time. Generally, a conventional algorithm of the ECC function generates an 8-bit verifying ECC code according to 64-bit data. When the data is read from the memory, the control chip reads the data and corresponding verifying ECC code simultaneously, and generates syndrome bits based on the data and the verifying ECC code for determining whether the read data is correct. The syndrome bits can indicate which bit of the data is incorrect, and the wrong bit will be corrected. If two bits are incorrect, the control chip reports an error message instead of correcting errors.

Since the conventional algorithm of the ECC function is for 64-bit data/8-bit verifying ECC code, a partial-write function might be performed on data, the partial-write function including read/modify/write commands. For instance, suppose that an 8 bits of data is being written into the memory. The ECC function is performed on 64 bits of data taken as integrated data for generating an 8-bit verifying ECC code. Therefore, a corresponding 56 bits of data (and verifying ECC code) must be read from the memory for integrating the 64 bits of data needed by the ECC function. Then data can be written in the memory.

In the prior art, when accessing data in the memory, the ECC function must be performed to ensure data precision. Thus, the computer system must consume more system resources for providing the ECC function, especially for the partial-write function. Therefore, the performance of the computer system is reduced. If the ECC function is not executed, the performance of the computer system is higher, but the accessed data might be incorrect. In other words, prior art computer systems do not have a good balance between performance and data precision.

SUMMARY OF INVENTION

It is therefore a primary objective of the claimed invention to provide a method and related apparatus for performing an ECC function to solve the above-mentioned problem.

The claimed invention sets an ECC range and a non-ECC range according to settings recorded by a basic input/output system when booting the computer system. When reading or writing data, the claimed invention detects whether the address of the data is within in the ECC range or the non-ECC range so as to determine whether the ECC function is performed on the data. Therefore, the claimed invention can obtain a better balance between performance and data precision.

For instance, the chipset usually includes a graphics processing circuit for processing video data, such as each frame on a display. Such video data is changed frequently and only changed a little (changed bits are typically fewer than 64 bits). If performing the ECC function on such video data, read/modify/write commands should be sent many times and thereby dramatically affect the performance of the computer system. However, the user of the computer system may not require high precision of such video data. Thus, the claimed invention sets a graphic frame buffer area as the non-ECC range. When accessing video data, the ECC function is not performed and data is directly accessed because the graphic frame buffer area is regarded as the non-ECC range. This reduces the number of read/modify/write commands and raises the performance. In addition, other memory areas can be regarded as the ECC range. When accessing data in the ECC range, the ECC function is performed. Therefore, programs requiring higher data precision can use the ECC range to access data. In other words, the claimed invention can execute or not execute the ECC function according to the requirements of different data. The claimed invention can ensure data precision and reduce redundant read/modify/write commands.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
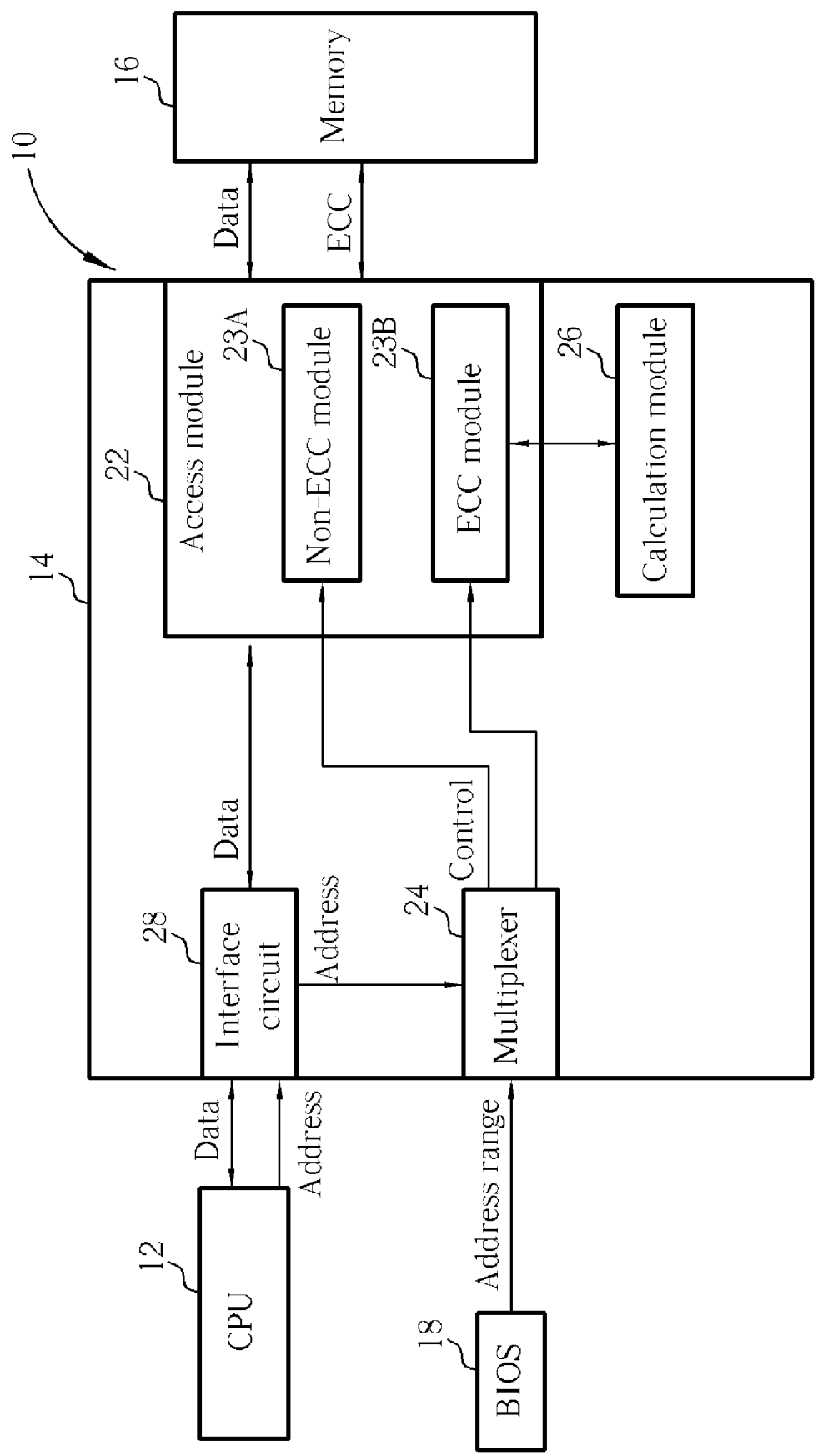
FIG. 1 is a diagram of a chipset of the present invention implemented in a computer system.

Please refer to FIG. 1, which is a diagram of a chipset 14 of the present invention implemented in a computer system 10. The computer system comprises a central processing unit (CPU) 12, a basic input/output system (BIOS) 18, a chipset 14, and a memory 16. The CPU 12 executes programs and processes data to control the operation of the computer system 10. The memory 16 can be a random-access memory (RAM) supporting the ECC function for temporarily storing data and programs needed by the CPU 12. The chipset 14 manages data transmission between the CPU 12 and the memory 16, and executes the ECC function when accessing data. When booting the computer system, the BIOS 18 not only stores settings and program codes for basic inspection, but also sets an ECC range and a non-ECC range.

In order to implement the present invention, the chipset 14 comprises an access module 22, a calculation module 26, an interface circuit 28, and a multiplexer 24. The access module 22 includes a non-ECC module 23A and an ECC module 23B.

When the CPU 12 (or other device or circuit) accesses data from the memory 16, the interface circuit 28 obtains a certain address. According to address ranges set by the BIOS 18, the multiplexer 24 determines whether the address transmitted from the interface circuit 28 is within the ECC range or the non-ECC range for controlling the access module 22 to access data, and determines whether the ECC function is performed on the data. If the multiplexer 24 detects the address of the data is within the ECC range, the ECC module 23B of the access module 22 sends read/modify/write commands (if necessary), and the calculation module 26 performs the ECC function on the data. For instance, the calculation module 26 uses a specific ECC algorithm (such as a algorithm for 64-bit data/8-bit verifying ECC code) to calculate a corresponding verifying ECC code, and the verifying ECC code is stored in the memory 16 by the ECC module 23B. Otherwise, the calculation module 26 generates a parity-bit check to ensure data precision. On the contrary, if the multiplexer 24 detects that the address of the data is within the non-ECC range, the non-ECC module 23A of the access module 22 directly accesses data corresponding to the address, and read/modify/write commands will not be executed and the ECC algorithm will not be performed.

Figure 2:
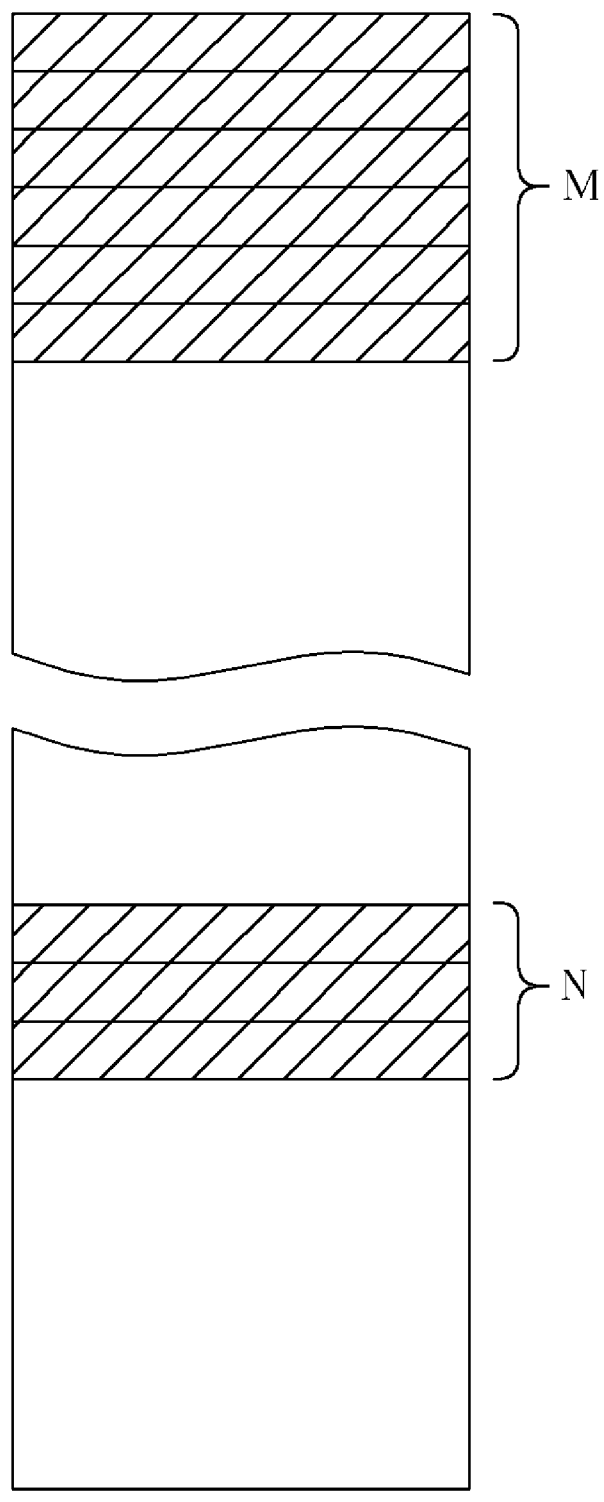
FIG. 2 is a diagram of memory space of the memory of FIG. 1.

In the preferred embodiment of the present invention, the BIOS 18 provides an interface for a user to arrange the memory space when booting the computer and records related settings. Please refer to FIG. 2, which is a diagram of memory space of the memory 16 of FIG. 1. For instance, the user divides the memory space into the ECC range and the non-ECC range through the BIOS 18. As shown in FIG. 2, hatched regions M and N represent non-ECC ranges and other regions are ECC ranges. After the computer system 10 is powered on and operating, the chipset 14 is capable of determining how to access the memory 16 according to the ECC range and the non-ECC range.

As mentioned above, when the prior art accesses data in the memory, sending read/modify/write commands consumes system resources. For instance, when playing video, the number of read/modify/write commands is large and thereby reduces the performance of the computer system. However, the present invention sets a graphic frame buffer area of the memory 16 as the non-ECC range, as shown by the hatched region M of FIG. 2. When accessing graphics or playing video in such address range, the multiplexer 24 determines not to perform the ECC function because the graphic frame buffer area is set as the non-ECC range. That is, when playing video, read/modify/write commands should not be sent many times. An address range, whose requirement of data precision is not high, is mainly selected as the non-ECC range, and is not only limited to the graphic frame buffer area. In addition, other areas not set as the non-ECC range are ECC ranges. When accessing data in the ECC ranges, the ECC function should be performed on data.

Figure 3:
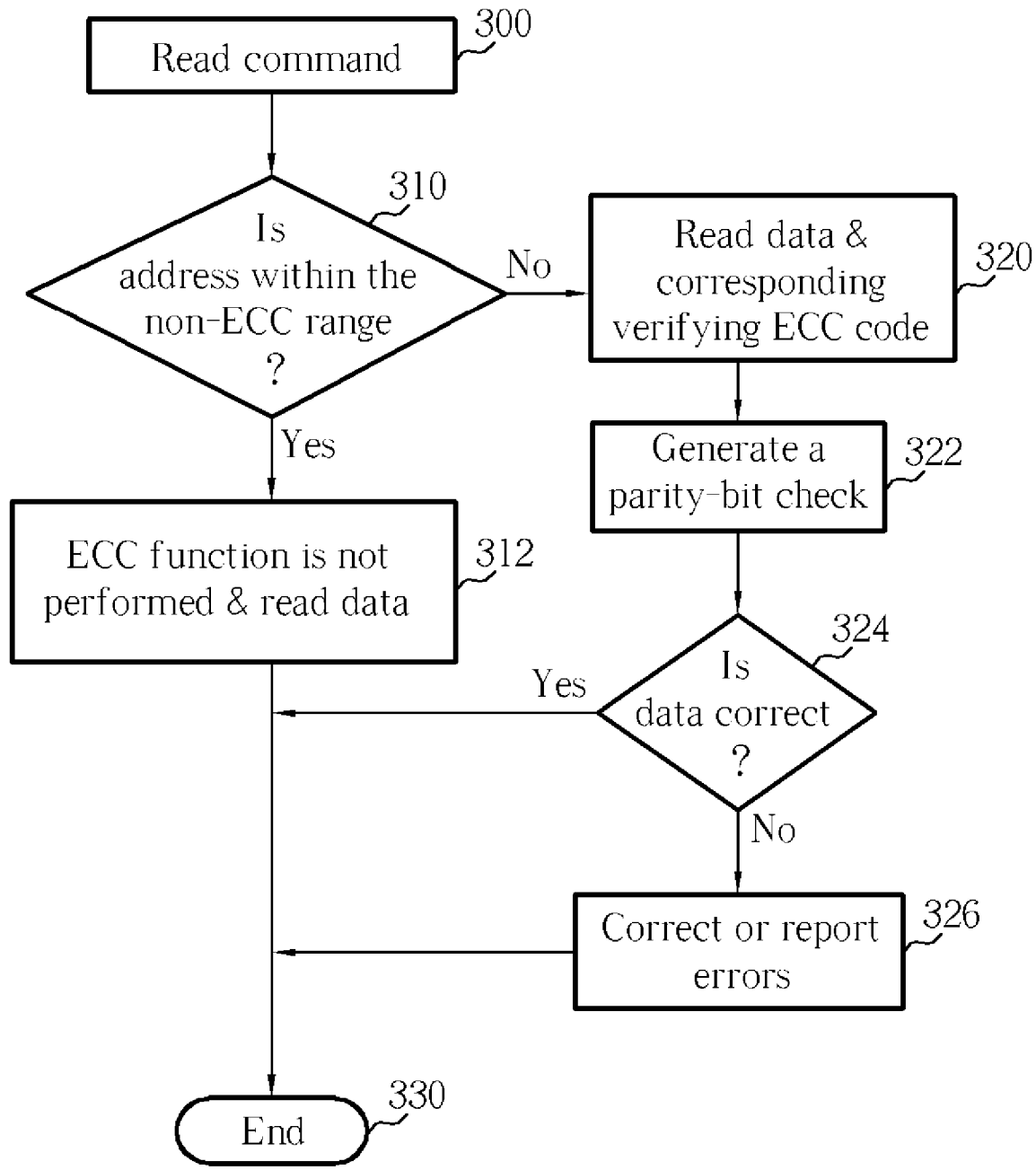
FIG. 3 is a flowchart of when the computer system of FIG. 1 executes a read command.

Please refer to FIG. 3, which is a flowchart of when the computer system 10 of FIG. 1 executes a read command. The steps are as follows.

Step 300: The computer system 10 executes a read command so that an address of the memory 16 is assigned through the chipset 14 to read data of the assigned address.

Step 310: The multiplexer 24 determines whether the assigned address is within the non-ECC range according to settings recorded by the BIOS 18 when booting the computer. If the assigned address is within the non-ECC range, step 312 is entered. Otherwise, step 320 is entered.

Step 312: The calculation module 26 does not perform the ECC function on data of the assigned address. Instead, data of the assigned address is directly read and step 330 is entered.

Step 320: The multiplexer 24 detects the assigned address is part of the address range having a requirement of high data precision. Therefore, the assigned-address data and corresponding verifying ECC code are read from the memory 16, and step 322 is entered.

Step 322: The calculation module 26 generates a parity-bit check according to the read data.

Step 324: The calculation module 26 generates syndrome bits based on the parity-bit check and the read verifying ECC code to determine whether the read data is correct. If the data is correct, step 330 is entered. Otherwise, step 326 is entered.

Step 326: If a bit of the read data is incorrect, the calculation module 26 can correct the error bit based on the verifying ECC code. If two bits are incorrect, an error message is reported, and step 330 is entered.

Step 330: The read command is ended.

Figure 4:
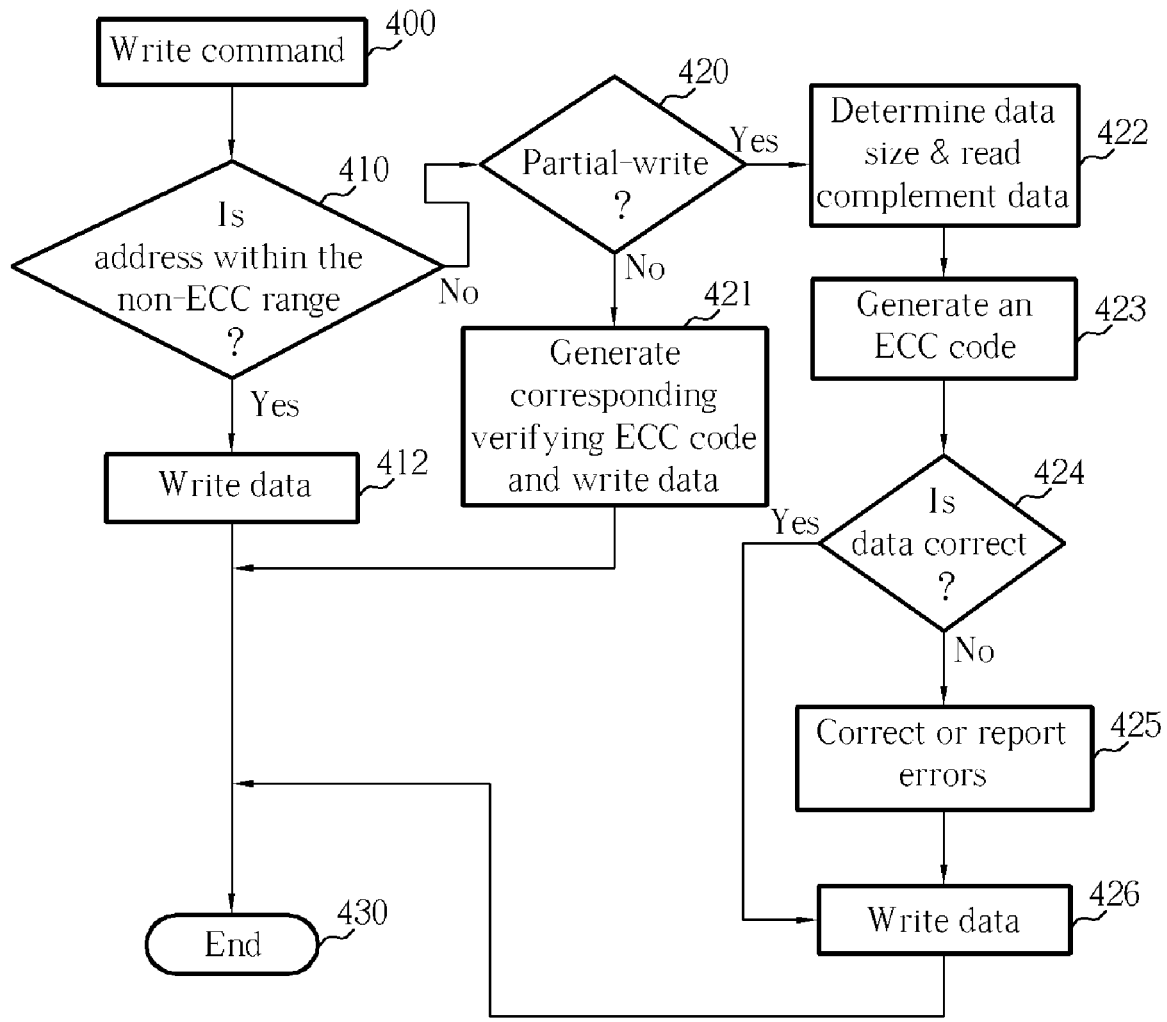
FIG. 4 is a flowchart of when the computer system of FIG. 1 executes a write command.

Please refer to FIG. 4, which is a flowchart of when the computer system 10 of FIG. 1 executes a write command. The steps are as follows.

Step 400: The computer system 10 executes a write command to write data into an assigned address.

Step 410: Step 410 is similar to step 310 of FIG. 3. The multiplexer 24 detects the assigned address. If the assigned address is within the non-ECC range, step 412 is entered. Otherwise, step 420 is entered.

Step 412: The calculation module 26 does not perform the ECC function on data of the assigned address. Instead, data of the assigned address is directly written and step 430 is entered.

Step 420: The multiplexer 24 determines whether the ECC function is performed or not. If bits of the written data are fewer than 64, step 422 is entered to perform the partial-write function. Otherwise, step 421 is entered.

Step 421: The calculation module 26 generates a verifying ECC code corresponding to the data to be written. Then the data to be written and the verifying ECC code are stored in the memory 16. After that, step 430 is entered.

Step 422: The calculation module 26 detects the size of the data to be written. If the size of data to be written is less than a predetermined size (such as 64 bits), complement data corresponding to the data to be written is read from the memory 16. For instance, if data to be written is 8 bits in length and the predetermined size is 64 bits, the size of the complement data must be 56 bits. The 56-bit complement data is read from the memory 16. Step 432 is entered.

Step 423: The calculation module 26 generates an ECC code based on the data to be written and the complement data.

Step 424: The calculation module 26 determines whether the data is correct according to the ECC code. If the data is correct, step 426 is entered. Otherwise, step 425 is entered.

Step 425: The calculation module 26 corrects data or reports error messages according to the ECC code.

Step 426: The data is written into the memory 16.

Step 430: The write command is ended.

When the non-ECC module 23A writes data fewer than 64 bits into the memory 16, the data fewer than 64 bits is written into the memory 16 by using a data input/output mask (DQM). In the current memory configuration, a bus having 64-bit data lines is connected between the chipset 14 and the memory 16 to transmit 64 bits of data at once. If the memory 16 supports the ECC function, there are additional 8-bit data lines to transmit the 8-bit verifying ECC code between the chipset 14 and the memory 16. When the DQM is executed, some data lines are disabled, not receiving data. For instance, when the non-ECC module 23A writes 8-bit data into the memory 16, the DQM disables the other 56 data lines so as to directly write the 8-bit data into the memory 16. On the contrary, the ECC module 23B does not use DQM because the ECC module 23B will execute the partial-write function to gather 64 bits if data to be written is less than 64 bits in size. By the partial-write function, the calculation module 26 can calculate a corresponding 8-bit verifying ECC code, and the ECC module 23B stores the 64-bit data and the 8-bit verifying ECC code into the memory 16 through the 64-bit data lines and the 8-bit ECC data lines, respectively.

Similarly, when the ECC module 23B reads data from the memory 16, the 8-bit ECC data lines must be enabled so as to read a corresponding verifying ECC code. However, it is not necessary for the non-ECC module 23A to enable the 8-bit ECC data lines. No matter reading or writing data, the 8-bit ECC data lines can be enabled or disabled when the ECC function is not performed. Suppose that the ECC data lines are always enabled. When the non-ECC module 23A writes data into the memory 16, a dummy verifying ECC code will be written through the 8-bit ECC data lines. Basically, the dummy verifying ECC code has no relation to the data to be written because the non-ECC module 23A accesses data from the non-ECC range. Similarly, when the non-ECC module 23A reads data from the memory 16, a corresponding verifying ECC code is also read through the 8-bit ECC data lines. The read verifying ECC code will not be used and does not affect data access because the non-ECC module 23A accesses data of the non-ECC range (i.e. the ECC function is not performed). In addition, when reading/writing data in the memory 16, the non-ECC module 23A can disable the 8-bit ECC data lines. The non-ECC module 23A and the ECC module 23B can be integrated into the access module 22. The multiplexer 24 controls the access module 22 to use the non-ECC module 23A or the ECC module 23B. The multiplexer 24, the non-ECC module 23a, the ECC module 23B, and the calculation module 26 can be implemented by hardware and/or firmware codes.

Compared to the prior art, when accessing data, the present invention detects addresses of the data to determine whether the ECC function is performed, as shown in step 310 of FIG. 3 and step 410 of FIG. 4. Therefore, the present invention can avoid the drawbacks of the prior art so as to provide a better balance between performance of the computer system 10 and data precision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining whether an error checking-correcting (ECC) function is performed when accessing a memory in a computer system, the method comprising:
   setting an ECC range and a non-ECC range of a memory space of the memory;
   detecting an address of first data when accessing the first data in the memory;
   determining whether the address of the first data is within the ECC range or the non-ECC range; and
   determining whether to perform an ECC function on the first data according to determination of whether the address of the first data is within the ECC range or the non-ECC range.

2. The method of claim 1 further comprising performing a partial-write function on the first data when the address of the first data is within the ECC range, the partial-write function comprising:
   detecting a size of the first data;
   reading second data from the memory if the size of the first data is less than a predetermined size; and
   calculating a verifying ECC code according to the first and the second data.

3. The method of claim 2 wherein the partial-write function is not performed on the first data when the address of the first data is within the non-ECC range.

4. The method of claim 1 wherein the non-ECC range is a graphic frame buffer area.

5. A chipset connected to a memory, the chipset comprising:
   an access module for accessing data in the memory;
   a multiplexer connected to the access module for determining whether an address of the data is within an ECC range or a non-ECC range and outputting the data accordingly; and
   a calculation module for calculating a verifying ECC code by performing an ECC function when the address of the data is within the ECC range.

6. The chipset of claim 5 wherein the verifying ECC code is calculated according to the data and second data, the second data being read from the memory if the address of the data is detected within the ECC range by the multiplexer and if the size of the data is less than a predetermined size.

7. The chipset of claim 6 wherein the ECC function is an algorithm of 64-bit data and an 8-bit verifying ECC code.

8. The chipset of claim 5 wherein the access module stores graphics in the non-ECC range.

9. The chipset of claim 5 wherein the multiplexer sets the ECC range and the non-ECC range according to setting or settings recorded by a basic input/output system.

10. The chipset of claim 5 wherein the access module further comprises:
   a non-ECC module for directly accessing the memory when the address of the data is within the non-ECC range, and not performing the ECC function; and
   an ECC module for performing read/modify/write on the data when the address of the data is within the ECC range.

11. The method of claim 1 further comprising performing the ECC function on the first data for calculating a verifying ECC code accordingly when determining the address of the first data is within the ECC range.

12. The method of claim 1 further comprising not performing the ECC function on the first data when determining the address of the first data is within the non-ECC range.

* * * * *